(12) United States Patent
Senoo et al.

(10) Patent No.: US 12,526,557 B2
(45) Date of Patent: Jan. 13, 2026

(54) RELAY APPARATUS, OPTICAL ACCESS SYSTEM AND RELAY METHOD

(71) Applicant: NTT, Inc., Tokyo (JP)

(72) Inventors: Yumiko Senoo, Musashino (JP); Kazutaka Hara, Musashino (JP); Shin Kaneko, Musashino (JP); Ryo Koma, Musashino (JP); Kazuaki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 258 days.

(21) Appl. No.: 18/285,591

(22) PCT Filed: Apr. 9, 2021

(86) PCT No.: PCT/JP2021/015037
§ 371 (c)(1),
(2) Date: Oct. 4, 2023

(87) PCT Pub. No.: WO2022/215257
PCT Pub. Date: Oct. 13, 2022

(65) Prior Publication Data
US 2024/0284081 A1 Aug. 22, 2024

(51) Int. Cl.
*H04Q 11/00* (2006.01)
*H04J 14/08* (2006.01)

(52) U.S. Cl.
CPC .......... *H04Q 11/0067* (2013.01); *H04J 14/08* (2013.01); *H04Q 2011/0079* (2013.01); *H04Q 2011/0086* (2013.01)

(58) Field of Classification Search
CPC .................................................. H04Q 11/0067
See application file for complete search history.

(56) References Cited

U.S. PATENT DOCUMENTS

| | | | |
|---|---|---|---|
| 2009/0010657 A1* | 1/2009 | Kazutaka | ............... H04B 10/29 398/173 |
| 2009/0232494 A1* | 9/2009 | Hehmann | ............ H04B 10/079 398/43 |

(Continued)

OTHER PUBLICATIONS

ITU-T G.989.2 Recommendation, "40-Gigabit-capable-passive optical networks 2(NG PON2): Physical media dependent (PMD) layer specification," Feb. 2019.

(Continued)

*Primary Examiner* — Shi K Li

(57) ABSTRACT

Provided a relay device that performs relay among a plurality of optical communication devices that perform communication using at least time division multiplexing, the device including a data length acquisition unit configured to acquire information on a data length of an uplink signal transmitted from the optical communication device using the uplink signal, a management control signal generation unit configured to generate a management control signal used for management and control, a management control signal division unit configured to divide the generated management control signal based on the information on the data length of the uplink signal acquired by the data length acquisition unit, and a management control signal superimposition unit configured to superimpose the divided management control signal on the uplink signal and transfers the superimposed signal to another optical communication device.

7 Claims, 11 Drawing Sheets

(56) References Cited

U.S. PATENT DOCUMENTS

| | | |
|---|---|---|
| 2010/0080558 A1 | 4/2010 | Kazawa et al. |
| 2011/0150482 A1 | 6/2011 | Furusawa et al. |
| 2019/0074910 A1* | 3/2019 | Seo .................. H04B 10/69 |
| 2021/0126767 A1 | 4/2021 | Park |
| 2022/0116109 A1 | 4/2022 | Uematsu et al. |

OTHER PUBLICATIONS

Y. Luo, et al., "Physical Layer Aspects of NG-PON2 Standards—Part 2: System Design and Technology Feasibility [Invited]," J. Opt. Commun. Netw., 8(1), pp. 43-52, Jan. 2016.

* cited by examiner

RELAY APPARATUS, OPTICAL ACCESS SYSTEM AND RELAY METHOD

CROSS-REFERENCE TO RELATED APPLICATIONS

This application is a 371 U.S. National Phase of International Application No. PCT/JP2021/015037, filed on Apr. 9, 2021. The entire disclosure of the above application is incorporated herein by reference.

TECHNICAL FIELD

The present invention relates to a relay device, an optical access system, and a relay method.

BACKGROUND ART

Fiber to the home (FTTH) is spreading worldwide, and most of FTTH is provided by a Time Division Multiplexing-Passive Optical Network (TDM-PON) method having excellent economic efficiency. In the TDM-PON method, one optical line terminal (OLT) accommodates a plurality of optical network units (ONUs) by time division multiplexing (TDM).

FIG. 10 illustrates a configuration of a conventional TDM-PON system. As illustrated in FIG. 10, a conventional TDM-PON system 500 includes one OLT 510 and a plurality of ONUs 520. The OLT 510 and the plurality of ONUs 520 are connected to each other by one or more optical splitters 530, 540, and 550, and optical fibers. FIG. 10 illustrates a configuration in which the optical splitter 530 is connected to the OLT 510 by an optical fiber, the optical splitters 540 and 550 are connected to the optical splitter 530 by optical fibers, and two each of the ONUs 520 are connected to the optical splitters 540 and 550 by optical fibers. The plurality of ONUs 520 transmit data at transmission timings allocated from the OLT 510.

The OLT 510 includes an optical multiplexing/demultiplexing unit 511, an optical transmission unit 512, an optical reception unit 513, and a media access control unit 514. The optical multiplexing/demultiplexing unit 511 separates the uplink signal and the downlink signal. The optical transmission unit 512 converts data of an electrical signal to be transmitted into an optical signal. The optical reception unit 513 converts the optical signal output from the optical multiplexing/demultiplexing unit 511 into an electrical signal. In order to share an optical fiber among a plurality of ONUs 520, the media access control unit 514 schedules a transmission amount and a transmission timing for each ONU 520, and generates a gate frame. The optical transmission unit 512 transmits the generated gate frame to the ONU 520.

The ONU 520 includes an optical multiplexing/demultiplexing unit 521, an optical transmission unit 522, an optical reception unit 523, and a media access control unit 524. The optical multiplexing/demultiplexing unit 521 separates the uplink signal and the downlink signal. The optical transmission unit 522 converts data of an electrical signal to be transmitted into an optical signal. The optical reception unit 523 converts the optical signal output from the optical multiplexing/demultiplexing unit 521 into an electrical signal. The media access control unit 524 processes the gate frame transmitted from the OLT 510 and generates a report frame for requesting a band from the OLT 510. The ONU 520 ascertains the data transmission timing from the information of the transmission timing included in the gate frame, and transmits the data at the allocated transmission timing.

On the other hand, in the International Telecommunication Union Telecommunication Standardization sector (ITU-T) G. 989.2 recommendations, a PON system that performs wavelength multiplexing called point to point wavelength division multiplexing-PON (PtP WDM-PON) is defined (for example, refer to Non Patent Literature 1). In the PtP WDM-PON system, communication is performed using different wavelengths for each ONU in an uplink direction that is a direction from the ONU to the OLT and a downlink direction that is a direction from the OLT to the ONU.

As described in Non Patent Literature 1, in the PtP WDM-PON system, a management control signal called an auxiliary management and control channel (AMCC) is used as a signal for management and control used between the OLT and the ONU. The AMCC signal is a signal that is transmitted by being superimposed on a main signal after information to be transmitted is modulated by a predetermined method. When the AMCC signal is superimposed on the main signal and transmitted, the ONU can transmit a signal for management and control within a wavelength range of a wavelength used in the main signal. That is, management and control can be realized without using a dedicated wavelength range for management and control. When the AMCC signal is used for management and control, in the PtP WDM-PON system, a wavelength determining process in which an uplink wavelength and a downlink wavelength are determined is implemented by using the AMCC signal.

According to Non Patent Literature 1, there are two types of methods for superimposing the AMCC signal. A first method "baseband modulation" is a method of superimposing an AMCC signal on a main signal as a baseband signal on a transmitter (for example, the ONU) side. In the superimposition method of "baseband modulation", the AMCC signal is separated by a filter such as a low-pass filter (LPF) on the receiver (for example, the OLT) side.

A second method "low-frequency pilot tone" is a method of up-converting the AMCC signal to a certain carrier frequency and superimposing the AMCC signal on the main signal on the transmitter side. In the superimposition method of "low-frequency pilot tone", the AMCC signal is acquired by performing demodulation by signal processing or the like on the receiver side.

FIG. 11 illustrates a configuration of the PtP WDM-PON system using "low-frequency pilot tone". As illustrated in FIG. 11, a conventional PtP WDM-PON system 600 includes a plurality of OLTs 610 and a plurality of ONUs 620. The plurality of OLTs 610 and the plurality of ONUs 620 are connected to each other by a wavelength demultiplexing unit 630, an optical splitter 640, and optical fibers. FIG. 11 illustrates a configuration in which the wavelength demultiplexing unit 630 is connected to the OLTs 610 by optical fibers, the optical splitter 640 is connected to the wavelength demultiplexing unit 630 by an optical fiber, and the ONUs 520 are connected to the optical splitter 640 by optical fibers. As described above, the plurality of OLTs 610 perform communication using different wavelengths for respective ONUs 620 in the uplink direction and the downlink direction.

Each OLT 610 accommodates a different ONU 620 and processes an optical signal demultiplexed and input by the wavelength demultiplexing unit 630. The OLT 610 includes an optical multiplexing/demultiplexing unit 611, an optical transmission unit 612, a management control unit 613, and an optical reception unit 614. The optical multiplexing/ demultiplexing unit 611 separates the uplink signal and the downlink signal. The optical transmission unit 612 converts data of an electrical signal to be transmitted into an optical signal. The management control unit 613 superimposes the AMCC signal on the main signal at the electrical stage or acquires the AMCC signal at the electrical stage. The optical reception unit 614 converts the optical signal output from the optical multiplexing/demultiplexing unit 611 into an electrical signal.

The ONU 620 includes an optical multiplexing/demultiplexing unit 621, an optical transmission unit 622, a management control unit 623, and an optical reception unit 624. The optical multiplexing/demultiplexing unit 621 separates the uplink signal and the downlink signal. The optical transmission unit 622 converts data of an electrical signal to be transmitted into an optical signal. The management control unit 623 superimposes the AMCC signal on the main signal at the electrical stage or acquires the AMCC signal at the electrical stage. The optical reception unit 624 converts the optical signal output from the optical multiplexing/demultiplexing unit 621 into an electrical signal.

CITATION LIST

Non Patent Literature

Non Patent Literature 1: "ITU-T G.989.2 Recommendation, "40-Gigabit-capable-passive optical networks (NG-PON2): Physical media dependent (PMD) layer specification," February 2019. Non Patent Literature 2: Y. Luo, H. Roberts, K. Grobe, M. Valvo, D. Nesset, K. Asaka, H. Rohde, J. Smith, J. S. Wey, and F. Effenberger, "Physical Layer Aspects of G-PON2 Standards-Part 2: System Design and Technology Feasibility," J. Opt. Com-mun. Netw., 8(1), pp. 43-52, January 2016.

SUMMARY OF INVENTION

Technical Problem

When the AMCC signal can be used for TDM-PON, a signal for management and control can be transmitted within the wavelength range of the wavelength used for the main signal, and thus it is not necessary to use a dedicated optical wavelength range. Furthermore, it is not necessary to embed a signal for management and control in the main signal, and transmission efficiency of the main signal can be increased. The AMCC signal is a low-speed signal on the order of kb/s (kilo bit/sec) (for example, refer to Non Patent Literature 2). On the other hand, the TDM-PON signal is a high-speed signal on the order of Gb/s (Giga bit/sec). In the uplink direction of the TDM-PON, burst signals for controlling transmission timings such that frames from each ONU do not collide are exchanged between the OLT and the ONU.

The frame length of the low-speed AMCC signal is expected to be significantly longer than the frame length of the high-speed burst signal, and it has been difficult to superimpose the AMCC signal as the management control signal on the burst signal. Therefore, there is a problem that the management control signal cannot be used in the TDM-PON. Such a problem is not limited to TDM-PON, and is a problem common to at least general systems in which time division multiplexing is performed.

In view of the above circumstances, an object of the present invention is to provide a technique capable of using a management control signal in a system in which time division multiplexing is performed.

Solution to Problem

An aspect of the present invention is a relay device that performs relay among a plurality of optical communication devices that perform communication using at least time division multiplexing, the device including a data length acquisition unit configured to acquire information on a data length of an uplink signal transmitted from the optical communication device using the uplink signal, a management control signal generation unit configured to generate a management control signal used for management and control, a management control signal division unit configured to divide the generated management control signal based on the information on the data length of the uplink signal acquired by the data length acquisition unit, and a management control signal superimposition unit configured to superimpose the divided management control signal on the uplink signal and transfers the superimposed signal to another optical communication device.

An aspect of the present invention is an optical access system including a first optical communication device that performs communication using at least time division multiplexing, a second optical communication device, and a relay device that performs relay between the first optical communication device and the second optical communication device, in which the relay device includes a data length acquisition unit configured to acquire information on a data length of an uplink signal using the uplink signal transmitted from the first optical communication device, a management control signal generation unit configured to generate a management control signal used for management and control, a management control signal division unit configured to divide the generated management control signal based on the information on the data length of the uplink signal acquired by the data length acquisition unit, a management control signal superimposition unit configured to superimpose the divided management control signal on the uplink signal and transfers the superimposed signal to another optical communication device, a signal extraction unit configured to extract the divided management control signal superimposed on the uplink signal transferred from the relay device, and an integration unit configured to integrate the divided management control signals to restore the management control signal.

An aspect of the present invention is a relay method performed by a relay device that performs relay among a plurality of optical communication devices that perform communication using at least time division multiplexing, the method including acquiring information on a data length of an uplink signal transmitted from the optical communication device using the uplink signal; generating a management control signal used for management and control, dividing the generated management control signal based on the acquired information on the data length of the uplink signal, and superimposing the divided management control signal on the uplink signal and transferring the superimposed signal to another optical communication device.

Advantageous Effects of Invention

According to the present invention, a management control signal can be used in a system in which time division multiplexing is performed.

DESCRIPTION OF EMBODIMENTS

Hereinafter, an embodiment of the present invention will be described in detail with reference to the drawings.

(Overview)

In an optical access system according to the present invention, an AMCC signal is generated in a relay device that relays communication between an ONU and an OLT, the generated AMCC signal is divided based on an uplink burst signal transmitted from the ONU, and then the divided AMCC signal is superimposed on the uplink burst signal. As a result, the AMCC signal can be superimposed on the uplink burst signal. As a result, the AMCC signal can be used in the TDM-PON.

Details will be described below.

First Embodiment

Figure 1:
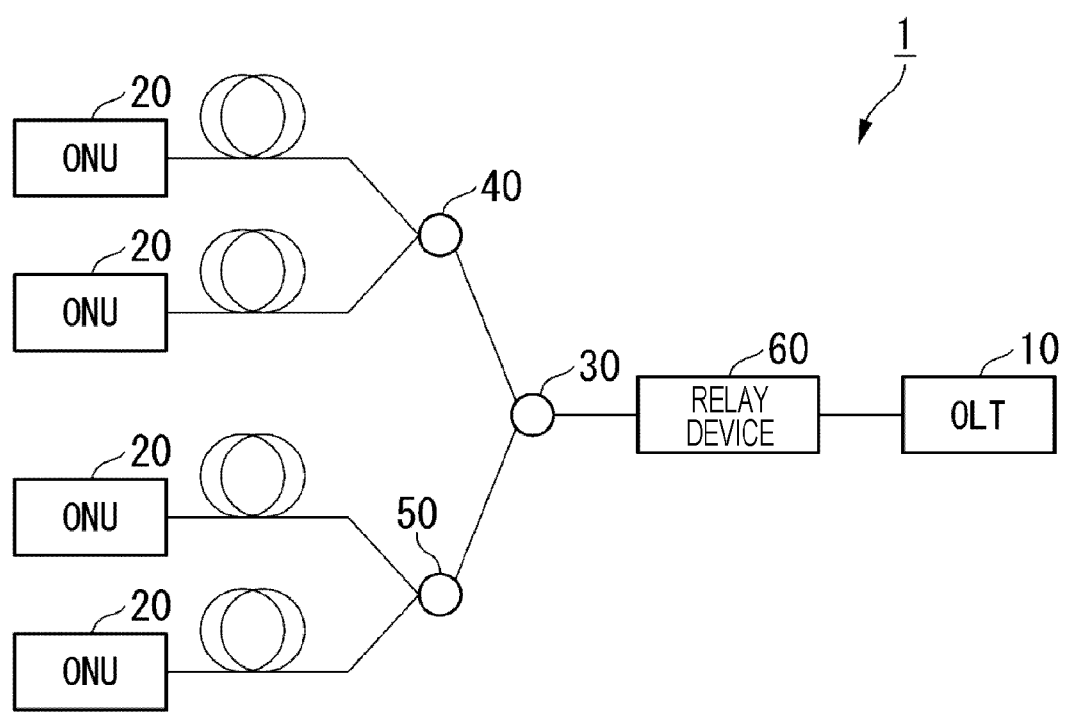
FIG. 1 is a diagram illustrating a configuration example of an optical access system according to a first embodiment.

FIG. 1 is a diagram illustrating a configuration example of an optical access system 1 according to a first embodiment.

The optical access system 1 includes an OLT 10, one or more ONUs 20, and a relay device 60. The OLT 10 and the relay device 60 are connected by an optical fiber. The ONU 20 and the relay device 60 are connected to one or more optical couplers 30, 40, and 50 by an optical fiber. FIG. 1 illustrates a configuration in which the optical coupler 30 is connected to the relay device 60 by an optical fiber, the optical couplers 40 and 50 are connected to the optical coupler 30 by optical fibers, and two ONUs 20 are connected to the optical couplers 40 and 50 by optical fibers. Hereinafter, a direction from the OLT 10 to the ONU 20 is referred to as a downlink direction, and a direction from the ONU 20 to the OLT 10 is referred to as an uplink direction.

The configuration illustrated in FIG. 1 is an example, and the numbers of ONUs 10, ONUs 20, and optical couplers included in the optical access system 1 are not particularly limited. In the optical access system 1, it is assumed that communication is performed between the OLT 10 and the ONU 20 by the TDM-PON method. The optical access system 1 uses "baseband modulation" which is a method of superimposing an AMCC signal on a main signal as a baseband signal.

The OLT 10 performs bandwidth assignment for the ONU 20. Specifically, the OLT 10 allocates a data transmission timing and a data transmission amount for each ONU 20. The data transmission timing represents a timing at which the ONU 20 starts transmission of the main signal. The transmission amount represents the data amount that can be transmitted by the ONU 20 in one transmission.

Figure 10:
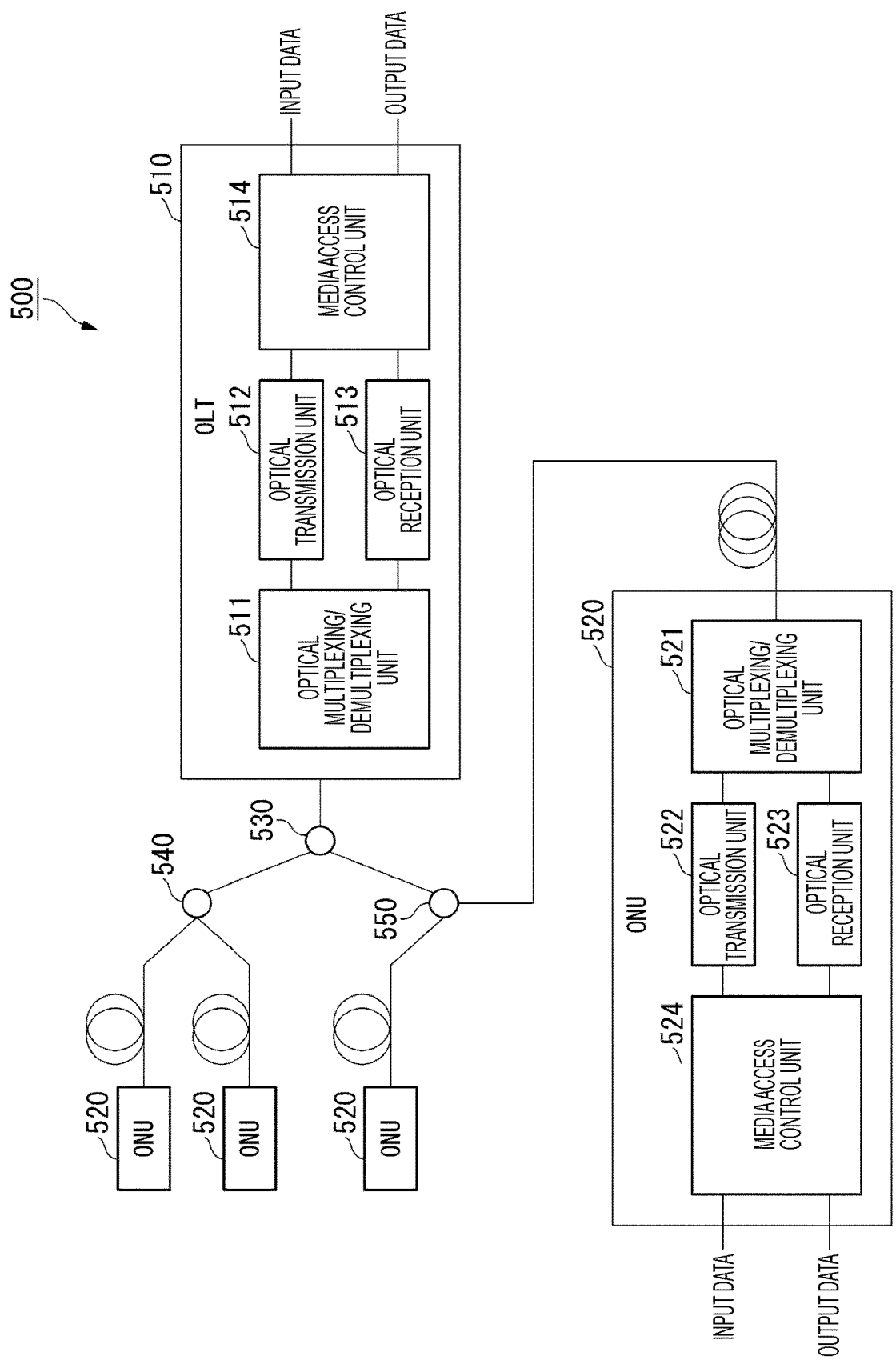
FIG. 10 is a diagram illustrating a configuration of a conventional TDM-PON system.
Figure 11:
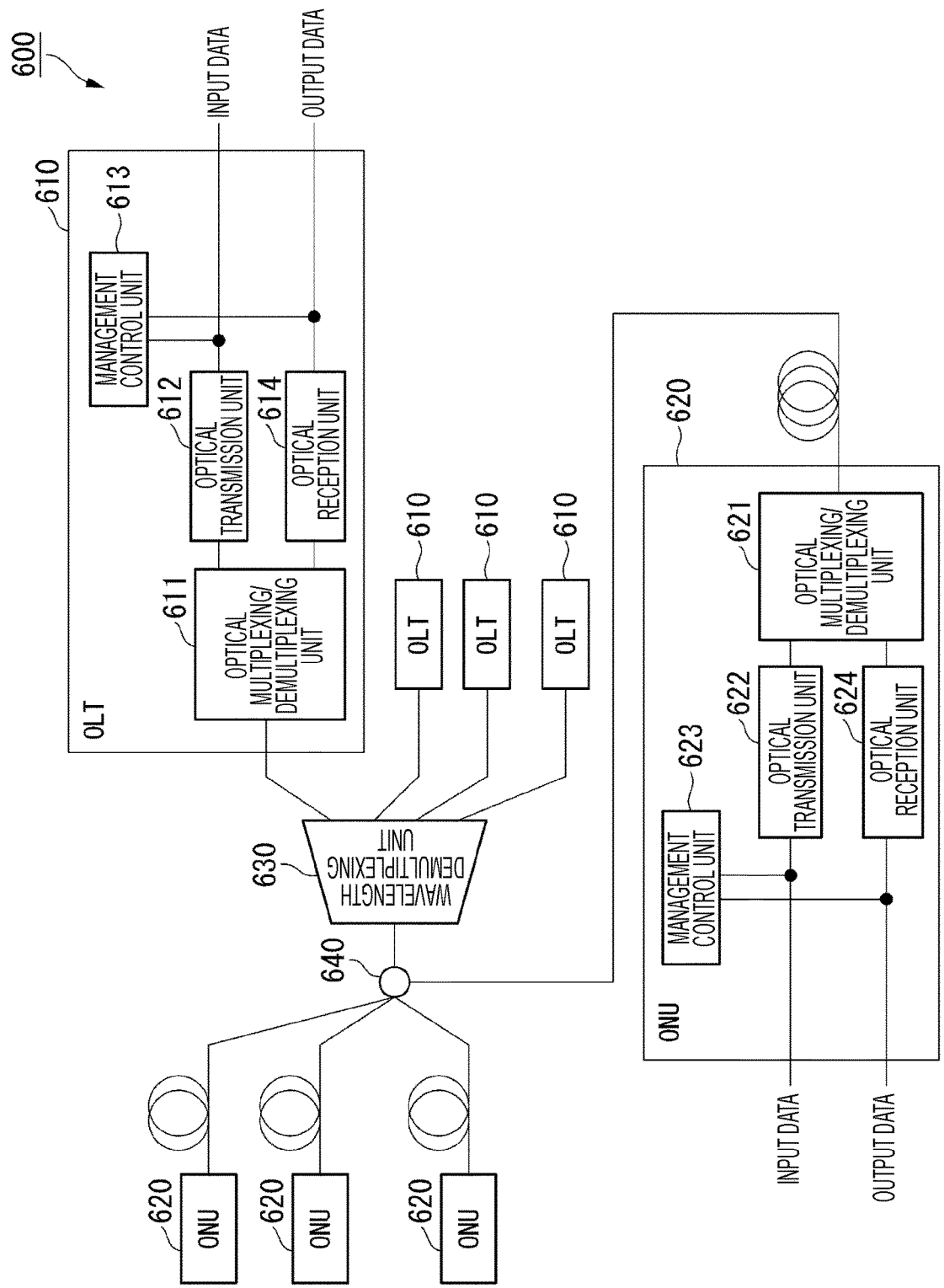
FIG. 11 is a diagram illustrating a configuration of a conventional PtP WDM-PON system.

The ONU 20 transmits an uplink burst signal to the OLT 10 based on the transmission timing and the transmission amount allocated from the OLT 10. The configuration of the ONU 20 is the same as that in the related art. For example, the ONU 20 has a configuration similar to that in FIG. 10.

The optical coupler 40 or the optical coupler 50 multiplexes the optical signals transmitted from the ONU 20 and outputs the multiplexed optical signals to the optical coupler 30. The optical coupler 30 multiplexes the optical signals output from the optical couplers 40 and 50 and outputs the multiplexed optical signals to the optical fiber. The optical signal output by the optical coupler 30 is input to the relay device 60 via the optical fiber.

The relay device 60 superimposes an AMCC signal on the uplink burst signal transmitted from the ONU 20 and transfers the superimposed signal to the OLT 10. Specifically, the relay device 60 generates the AMCC signal to be transmitted to the OLT 10, divides the generated AMCC signal, and superimposes the divided AMCC signal on an uplink burst signal that is a main signal. For example, the relay device 60 divides the AMCC signal within a range that can be superimposed on the uplink burst signal, and superimposes the divided AMCC signal on the uplink burst signal to generate transmission data. Dividing the AMCC signal means dividing one AMCC signal into a plurality of signals. For example, it means that the AMCC signal is divided into signals having a size that can be superimposed on the uplink burst signal in order from the head. In the following description, the AMCC signal after division is referred to as a divided AMCC signal.

Figure 2:
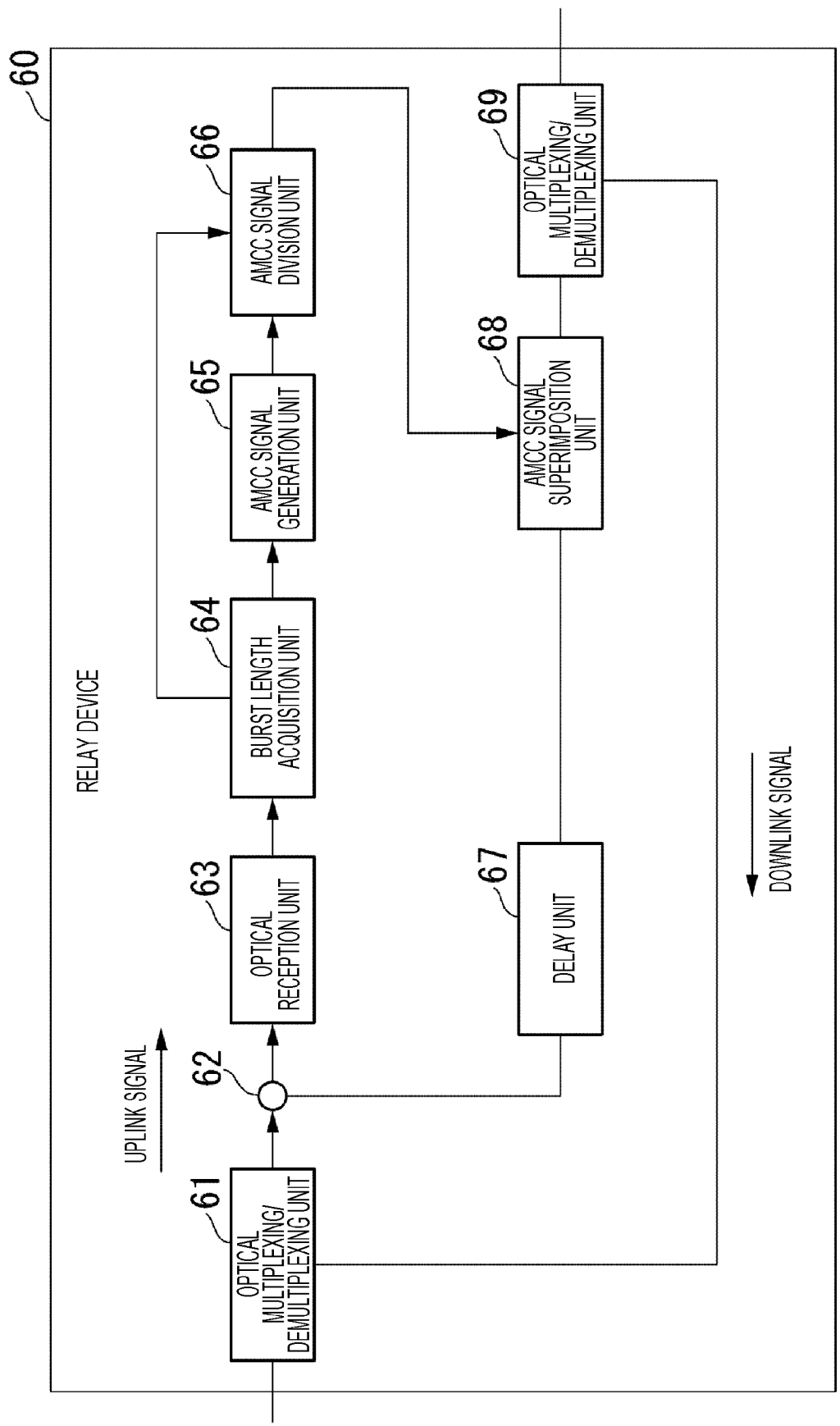
FIG. 2 is a diagram illustrating a configuration example of a relay device according to the first embodiment.

FIG. 2 is a diagram illustrating a configuration of the relay device 60 according to the first embodiment.

The relay device 60 includes an optical multiplexing/demultiplexing unit 61, a branching device (brancher) 62, an optical reception unit 63, a burst length acquisition unit (data length acquirer) 64, an AMCC signal generation unit (management control signal generator) 65, an AMCC signal division unit (management control signal divider) 66, a delay unit 67, an AMCC signal superimposition unit (management control signal superimpositor) 68, and an optical multiplexer/demultiplexer 69.

The optical multiplexing/demultiplexing unit 61 separates the uplink signal and the downlink signal. For example, the optical multiplexing/demultiplexing unit 61 outputs the uplink signal to the branching device 62 and outputs the downlink signal to the optical coupler 30. For example, the optical multiplexer/demultiplexer 69 outputs the uplink signal to the OLT 10 and outputs the downlink signal to the optical multiplexing/demultiplexing unit 61.

The branching device 62 branches the uplink signal (for example, the uplink burst signal) separated by the optical multiplexing/demultiplexing unit 61 and outputs the signal to a first path and a second path. As the branching device 62, for example, an optical splitter is conceivable. An optical splitter with a branching ratio of 1:9 may be used to output an optical signal with 10% intensity to the optical reception unit 63 and output an optical signal with 90% intensity to the delay unit 67. The first path is a path via the optical reception unit 63, and the second path is a path via the delay unit 67.

The optical reception unit 63 includes an optical/electrical (O/E) converter such as a photodetector therein. The optical reception unit 63 receives the uplink signal branched by the branching device 62, converts the received uplink signal into an electrical signal by the O/E converter, and outputs the electrical signal to the burst length acquisition unit 64. The optical reception unit 63 receives, for example, an uplink burst signal transmitted from the ONU 20.

The burst length acquisition unit 64 acquires burst length information of the uplink signal received by the optical reception unit 63. The burst length information is information indicating a transmission amount in the uplink signal. For example, the burst length acquisition unit 64 may acquire the burst length information from the burst length information described in the header of the received uplink signal, or may acquire the burst length information by measuring the optical intensity of the burst signal. The burst length acquisition unit 64 outputs the acquired burst length information to the AMCC signal division unit 66 and instructs the AMCC signal generation unit 65 to generate the AMCC signal. The burst length acquisition unit 64 is an aspect of a data length acquisition unit.

The AMCC signal generation unit 65 generates an AMCC signal used for management and control in accordance with an instruction from the burst length acquisition unit 64. The item managed and controlled by the AMCC signal may be control information or monitoring information on a transmission wavelength defined in ITU-T G.989.2 recommendation, or may include other information. The AMCC signal generation unit 65 is an aspect of a management control signal generation unit.

The AMCC signal division unit 66 acquires burst length information output from the burst length acquisition unit 64. The AMCC signal division unit 66 divides the AMCC signal generated by the AMCC signal generation unit 65 within a range not exceeding the burst length indicated by the burst length information based on the burst length information. For example, the AMCC signal division unit 66 divides the AMCC signal such that the AMCC signal division unit 66 has the same length as the burst length. The AMCC signal division unit 66 generates the divided AMCC signal by the above method. The AMCC signal division unit 66 is an aspect of the management control signal division unit.

The AMCC signal division unit 66 adds identification information including division identification information for each divided AMCC signal. A position to which the division identification information is added may be the head or the tail of the divided AMCC signal. The division identification information is identification information indicating that the AMCC signal is divided. For example, the division identification information may be divided onto identification information indicating that the division is in progress and division identification information indicating the end of the division, or may include information indicating the order of transmission. Note that the AMCC signal division unit 66 may not use the division identification information.

The delay unit 67 gives a delay to the uplink signal branched by the branching device 62. Specifically, the delay unit 67 gives a delay that is the same as the processing time required for the uplink signal to reach the AMCC signal superimposition unit 68 via the first path. For example, the delay unit 67 may be a delay line or may have another configuration as long as a delay can be provided.

The AMCC signal superimposition unit 68 superimposes the divided AMCC signal on the uplink signal (main signal) delayed by the delay unit 67. The AMCC signal superimposition unit 68 superimposes the divided AMCC signal on the main signal using, for example, a variable optical attenuator (VOA). The AMCC signal superimposition unit 68 outputs the uplink signal on which the divided AMCC signal is superimposed to the optical multiplexer/demultiplexer 69. The uplink signal on which the divided AMCC signal output to the optical multiplexer/demultiplexer 69 is superimposed is output to the OLT 10 by the optical multiplexer/demultiplexer 69. The AMCC signal superimposition unit 68 is an aspect of a management control signal superimposition unit.

Figure 3:
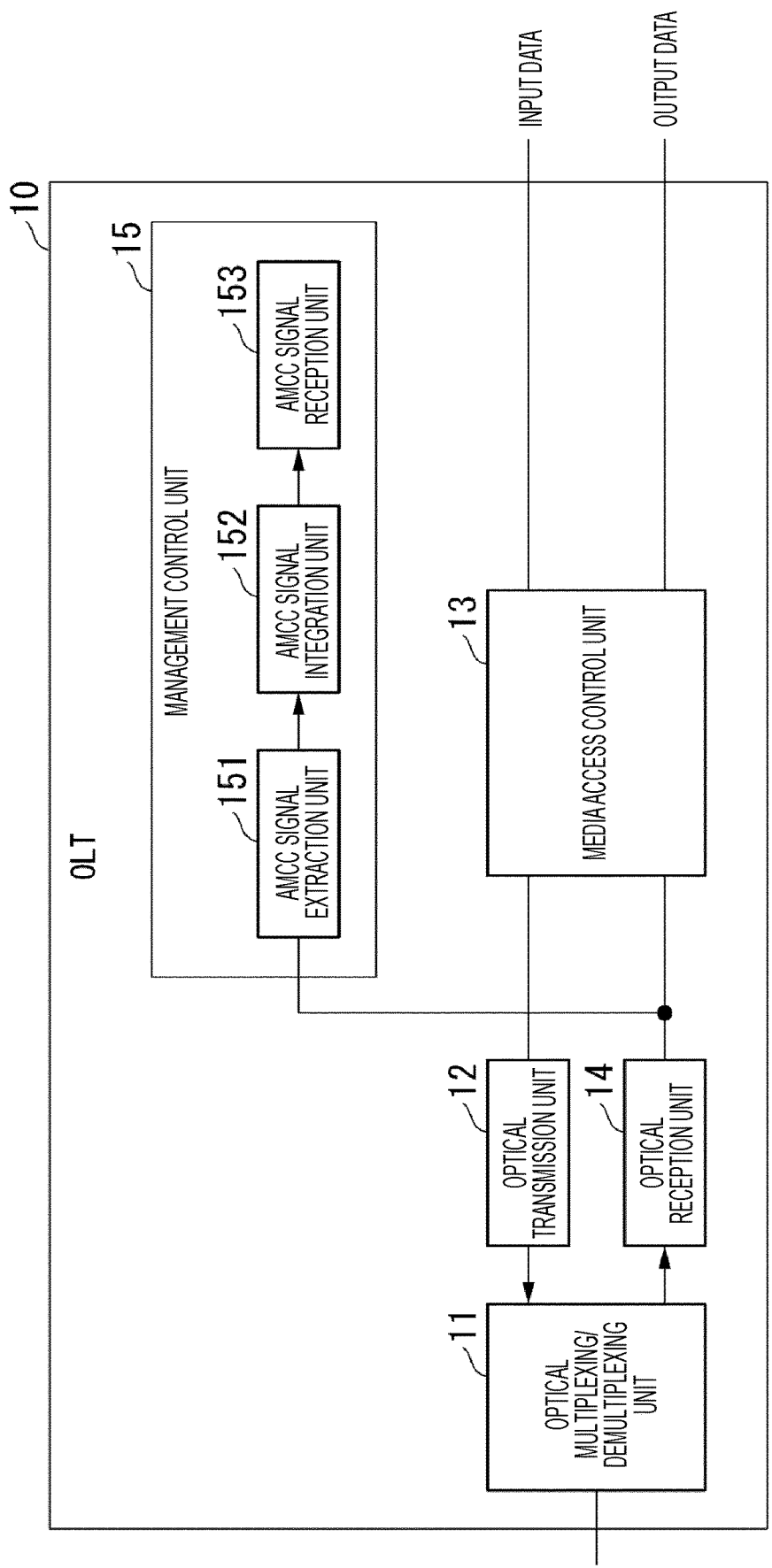
FIG. 3 is a diagram illustrating a configuration of an OLT according to the first embodiment.

FIG. 3 is a diagram illustrating a configuration of the OLT 10 according to the first embodiment.

The OLT 10 includes an optical multiplexing/demultiplexing unit 11, an optical transmission unit 12, a media access control unit 13, an optical reception unit 14, and a management control unit 15. The optical multiplexing/demultiplexing unit 11 separates the uplink signal and the downlink signal. The optical transmission unit 12 converts data of an electrical signal to be transmitted into an optical signal and transmits the optical signal to the relay device 60.

The media access control unit 13 schedules a transmission timing and a transmission amount for each OLT 10.

The optical reception unit 14 includes the O/E converter such as a photodetector therein. The optical reception unit 14 receives an optical signal via the optical multiplexing/demultiplexing unit 11, converts the received optical signal into an electrical signal by the O/E converter, and outputs the electrical signal to the media access control unit 13 and the management control unit 15. The optical reception unit 14 receives, for example, an uplink signal (optical signal) on which the divided AMCC signal transmitted from the relay device 60 is superimposed.

The management control unit 15 performs processing related to acquisition of the AMCC signal. The management control unit 15 includes an AMCC signal extraction unit 151, an AMCC signal integration unit 152, and an AMCC signal reception unit 153.

The AMCC signal extraction unit 151 extracts the divided AMCC signal superimposed on the electrical signal by signal processing or the like. For example, the AMCC signal extraction unit 151 extracts the divided AMCC signal superimposed on the electrical signal using the LPF.

The AMCC signal integration unit 152 integrates the divided AMCC signal extracted by the AMCC signal extraction unit 151. Integrating the divided AMCC signal means restoring one AMCC signal by combining a plurality of divided AMCC signals.

Note that, in a case where the division identification information is included in the divided AMCC signal, the AMCC signal integration unit 152 restores the AMCC signal by arranging the divided AMCC signals in order. In a case where the division identification information is not included in the divided AMCC signal, the AMCC signal integration unit 152 restores the AMCC signal by arranging the divided AMCC signals in order of acquisition.

The AMCC signal reception unit 153 performs management and control based on the restored AMCC signal.

Figure 4:
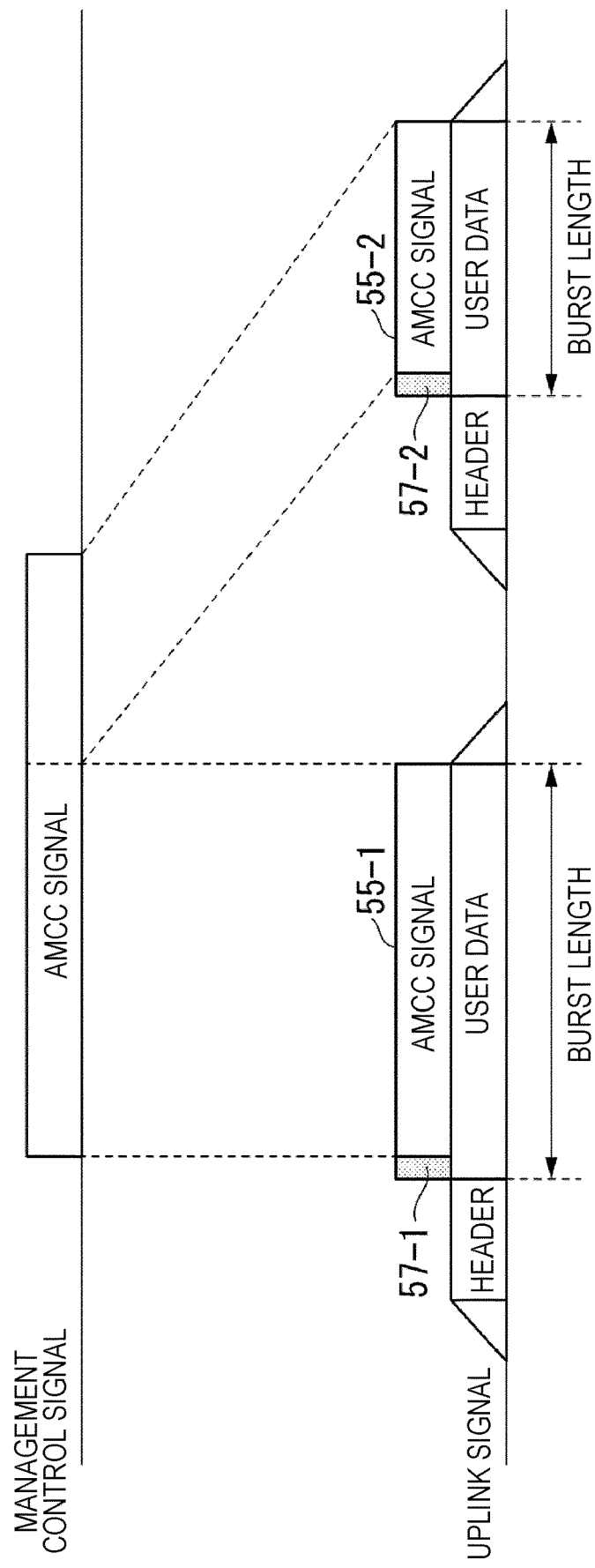
FIG. 4 is a diagram for explaining processing for transmitting an AMCC signal according to the first embodiment.

FIG. 4 is a diagram for explaining processing for transmitting the AMCC signal according to the first embodiment.

FIG. 4 illustrates a situation in which the AMCC signal is divided in the relay device 60 and the divided AMCC signal is superimposed on the user data of the uplink signal. The relay device 60 divides the AMCC signal based on burst length information obtained based on the uplink signal. As a result, the AMCC signal is divided into divided AMCC signals 55-1 and 55-2. In the example of FIG. 4, identification information 57-1 and 57-2 is assigned to the divided AMCC signals 55-1 and 55-2.

The relay device 60 superimposes the divided AMCC signal 55-1 on the user data of the uplink signal obtained first. The relay device 60 transfers the uplink signal on which the divided AMCC signal 55-1 is superimposed to the OLT 10. Thereafter, the relay device 60 superimposes the divided AMCC signal 55-2 on the user data of the uplink signal received next. In a case where the divided AMCC signal 55-2 does not fall within the burst length range of the uplink signal received next, the relay device 60 divides the divided AMCC signal 55-2 so as to fall within the burst length range. The relay device 60 transfers the uplink signal on which the divided AMCC signal 55-2 is superimposed to the OLT 10.

As described above, in the relay device 60 according to the first embodiment, the AMCC signal includes common information regardless of the ONU 20. Therefore, the relay device 60 may sequentially superimpose the divided AMCC signal on the received uplink signal.

Figure 5:
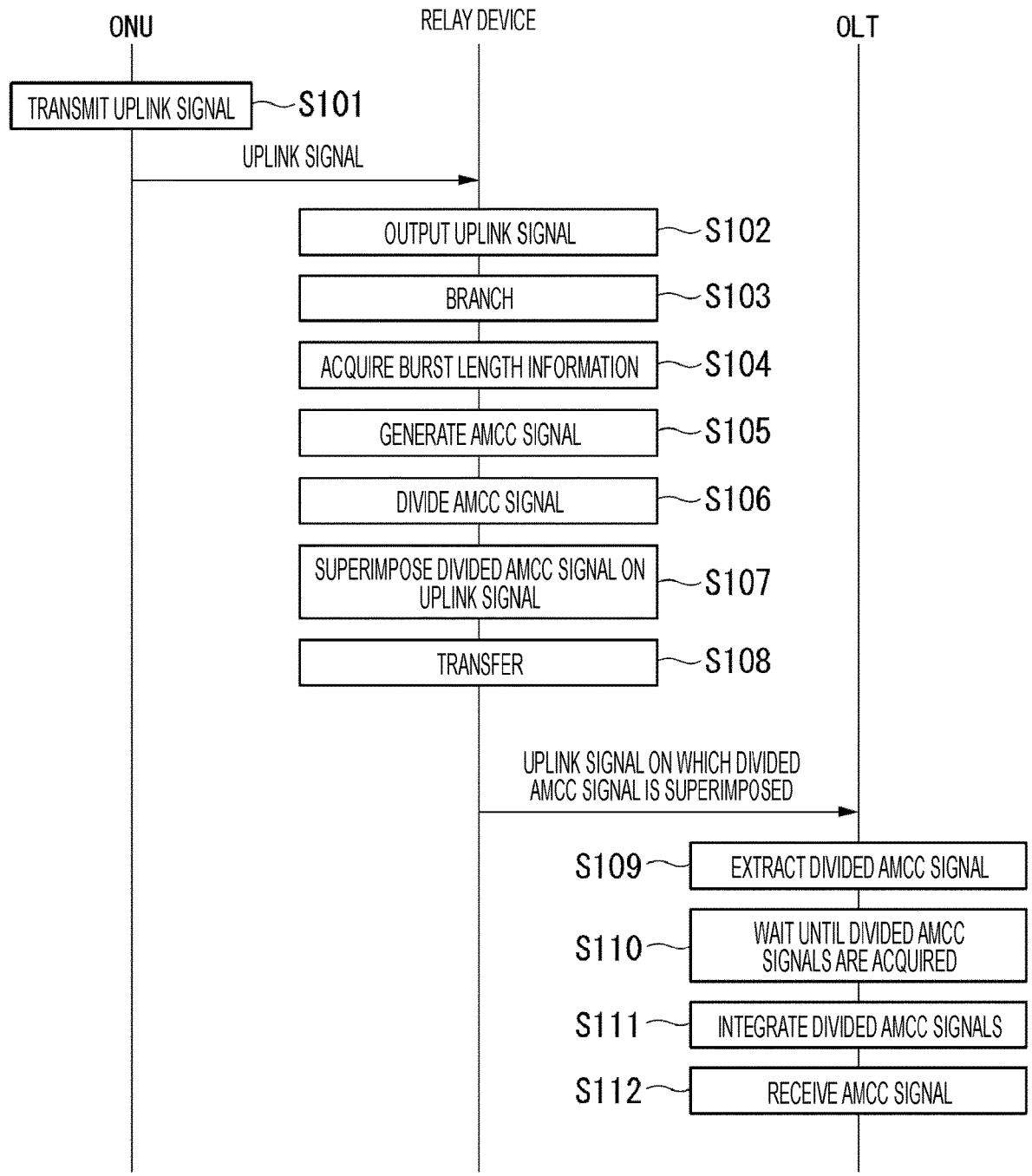
FIG. 5 is a sequence diagram illustrating a flow of processing of the optical access system according to the first embodiment.

FIG. 5 is a sequence diagram illustrating the processing flow of the optical access system 1 according to the first embodiment.

At the transmission timing allocated to the OLT 10, the ONU 20 generates an uplink signal (optical signal) and transmits the uplink signal to the optical fiber (step S101). The optical signal transmitted from the ONU 20 is input to the relay device 60.

The optical multiplexing/demultiplexing unit 61 of the relay device 60 outputs the uplink signal input via the optical fiber to the branching device 62 (step S102). The uplink signal input to the branching device 62 is branched into a first path and a second path and output to the paths (step S103). The uplink signal output to the first path is input to the optical reception unit 63. The uplink signal output to the second path is delayed by the delay unit 67.

The optical reception unit 63 converts the uplink signal into an electrical signal and outputs the electrical signal to the burst length acquisition unit 64. The burst length acquisition unit 64 acquires burst length information based on the electrical signal converted by the optical reception unit 63 (step S104). The burst length acquisition unit 64 outputs the acquired burst length information to the AMCC signal division unit 66 and instructs the AMCC signal generation unit 65 to generate the AMCC signal.

The AMCC signal generation unit 65 generates an AMCC signal in accordance with an instruction from the burst length acquisition unit 64 (step S105). The AMCC signal generation unit 65 outputs the generated AMCC signal to the AMCC signal division unit 66. The AMCC signal division unit 66 divides the AMCC signal output from the AMCC signal generation unit 65 according to the burst length notified from the burst length acquisition unit 64 (step S106).

Specifically, the AMCC signal division unit 66 divides the AMCC signal so that the signal has a magnitude not exceeding the burst length. As a result, the AMCC signal division unit 66 generates divided AMCC signals. The AMCC signal division unit 66 adds identification information to the generated divided AMCC signals. The AMCC signal division unit 66 outputs the divided AMCC signal to the AMCC signal superimposition unit 68.

Note that the AMCC signal division unit 66 may output the divided AMCC signals each time the burst length information is obtained from the burst length acquisition unit 64, instead of collectively outputting the divided AMCC signals. As a result, a plurality of divided AMCC signals are not output at the transfer timing of one piece of uplink data.

The AMCC signal superimposition unit 68 superimposes the divided AMCC signal output from the AMCC signal division unit 66 on the uplink signal delayed by the delay unit 67 (step S107). Specifically, the AMCC signal superimposition unit 68 superimposes the divided AMCC signal on the delayed uplink signal using the VOA. The uplink signal on which the divided AMCC signal is superimposed is input to the optical multiplexer/demultiplexer 69. The optical multiplexer/demultiplexer 69 outputs the uplink signal on which the input divided AMCC signal is superimposed to the OLT 10 (step S107).

The optical multiplexing/demultiplexing unit 11 of the ONU 20 outputs the uplink signal input via the optical fiber to the optical reception unit 14. The optical reception unit 14 converts the uplink signal input via the optical multiplexing/demultiplexing unit 11 into an electrical signal. The AMCC signal extraction unit 151 extracts the divided AMCC signal from the electrical signal converted by the optical reception unit 14 (step S109). The AMCC signal extraction unit 151 outputs the extracted divided AMCC signal to the AMCC signal integration unit 152. At present, there is only one divided AMCC signal. In this case, the AMCC signal integration unit 152 cannot restore the AMCC signal.

The processing from step S102 to step S108 is repeatedly executed every time an uplink signal is obtained in the relay device 60. For example, the processing from step S102 to step S108 is repeatedly executed until the relay device 60 finishes transmitting the divided AMCC signal.

The AMCC signal integration unit 152 waits until all the divided AMCC signals are acquired (step S110). For example, in a case where the division identification information is added to the divided AMCC signal, the AMCC signal integration unit 152 waits to perform the processing until the divided AMCC signal to which the division identification information indicating the end of the division is added is acquired. In a case where the division identification information is not added to the divided AMCC signal, the AMCC signal integration unit 152 waits to perform the processing until the divided AMCC signals for a predetermined period are acquired. The predetermined period may be set in advance.

When all the divided AMCC signals are acquired, the AMCC signal integration unit 152 integrates the plurality of acquired divided AMCC signals (step S111). As a result, the AMCC signal is restored. The AMCC signal integration unit 152 outputs the restored AMCC signal to the AMCC signal reception unit 153. The AMCC signal reception unit 153 receives the restored AMCC signal (step S112). Thereafter, the AMCC signal reception unit 153 performs management and control based on the received AMCC signal.

According to the optical access system 1 of the first embodiment configured as described above, the AMCC signal can be used in the TDM-PON. Specifically, the relay device 60 divides the AMCC signal according to burst length information in the uplink signal transmitted from the ONU 20. The relay device 60 superimposes the divided AMCC signal on the received uplink signal. As a result, the AMCC signal can be superimposed on the burst signal transmitted from the ONU 20. Therefore, the AMCC signal can be used in the TDM-PON.

Furthermore, in the optical access system 1, the AMCC signal can be inserted from a relay point of the network by superimposing the AMCC signal between the OLT 10 and the ONU 20. Therefore, the AMCC signal can be transmitted without passing through the user terminal.

Further, in the optical access system 1, by dividing the AMCC signal, a low-speed AMCC signal can be superimposed on a high-speed burst signal. Therefore, also in the TDM-PON, it is not necessary to embed a signal for management and control in the main signal, and transmission efficiency of the main signal can be enhanced.

Second Embodiment

In the first embodiment, the configuration in which the relay device superimposes the divided AMCC signal every time the uplink signal is obtained from the ONU regardless of the ONU that is the transmission source of the uplink signal has been described. In a second embodiment, a configuration in which an AMCC signal for each ONU is generated in the relay device 60, and the AMCC signal corresponding to each ONU is divided and superimposed on the uplink signal will be described.

In the second embodiment, a basic system configuration is equivalent to that of the first embodiment. A difference from the first embodiment is a configuration of the relay device. Thus, the relay device will be described below.

Figure 6:
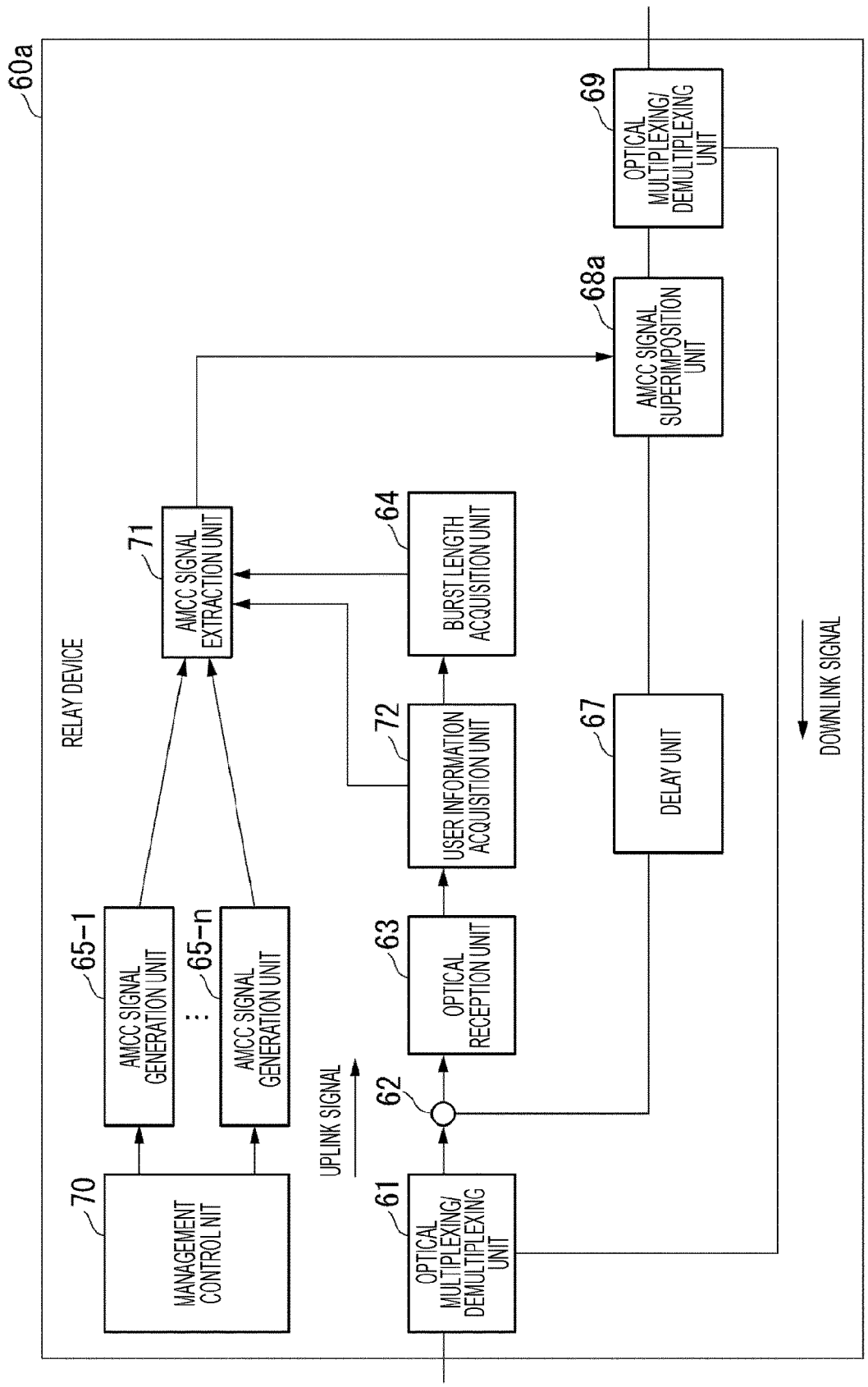
FIG. 6 is a diagram illustrating a configuration example of a relay device according to a second embodiment.

FIG. 6 is a diagram illustrating a configuration of a relay device 60a according to the second embodiment.

The relay device 60a includes the optical multiplexing/demultiplexing unit 61, the branching device 62, the optical reception unit 63, the burst length acquisition unit 64, AMCC signal generation units 65-1 to 65-n, the delay unit 67, an AMCC signal superimposition unit 68a, the optical multiplexer/demultiplexer 69, a management control unit 70, an AMCC signal extraction unit 71, and a user information acquisition unit (user information acquirer) 72. n is an integer of 2 or more. For example, the AMCC signal generation units 65-1 to 65-n are provided as many as the ONUs 20 accommodated in the relay device 60a.

The relay device 60a is different from the relay device 60 in that a plurality of AMCC signal generation units 65-1 to 65-n and an AMCC signal superimposition unit 68a are provided instead of the AMCC signal generation unit 65 and the AMCC signal superimposition unit 68, and a management control unit 70, an AMCC signal extraction unit 71, and a user information acquisition unit 72 are newly provided. The other configurations of the relay device 60a are similar to those of the relay device 60. Therefore, the entire description of the relay device 60a will be omitted, and the AMCC signal generation units 65-1 to 65-n, the AMCC signal superimposition unit 68a, the management control unit 70, the AMCC signal extraction unit 71, and the user information acquisition unit 72 will be described.

The user information acquisition unit 72 acquires transmission source information from information included in the uplink signal received by the optical reception unit 63. For example, the user information acquisition unit 72 acquires information for identifying the transmission source ONU 20.

The management control unit 70 holds information for managing and controlling each ONU 20. The information for management and control is information included in the AMCC signal, and is information used for management and control of the ONU 20. Note that the management control unit 70 may be provided outside the relay device 60.

The AMCC signal generation units 65-1 to 65-n generate AMCC signals for the ONUs 20 from information for managing and controlling the ONUs 20 held by the management control unit 70. For example, the AMCC signal generation unit 65-1 generates an AMCC signal for the ONU 20-1. In this manner, the AMCC signal generation units 65-1 to 65-n generate AMCC signals for the ONUs 20 related to the information held by the management control unit 70. That is, the AMCC signal generation units 65-1 to 65-n generate AMCC signals including information for the ONU 20 having information for management and control held by the management control unit 70.

The AMCC signal extraction unit 71 extracts the AMCC signal based on the transmission source information acquired by the user information acquisition unit 72 and the burst length information acquired by the burst length acquisition unit 64. Specifically, the AMCC signal extraction unit 71 divides and extracts the AMCC signal for the ONU 20 specified by the transmission source information within a range not exceeding the transmission amount indicated by the burst length information. As described above, the AMCC signal extraction unit 71 has a function of dividing and extracting the AMCC signal for the ONU 20 specified by the transmission source information among the AMCC signals for the ONUs generated by the AMCC signal generation units 65-1 to 65-n. The AMCC signal extraction unit 71 is an aspect of a management control signal division unit.

The AMCC signal superimposition unit 68a superimposes the extracted divided AMCC signal on the uplink signal (main signal) delayed by the delay unit 67. The AMCC signal superimposition unit 68a is an aspect of a management control signal superimposition unit.

Figure 7:
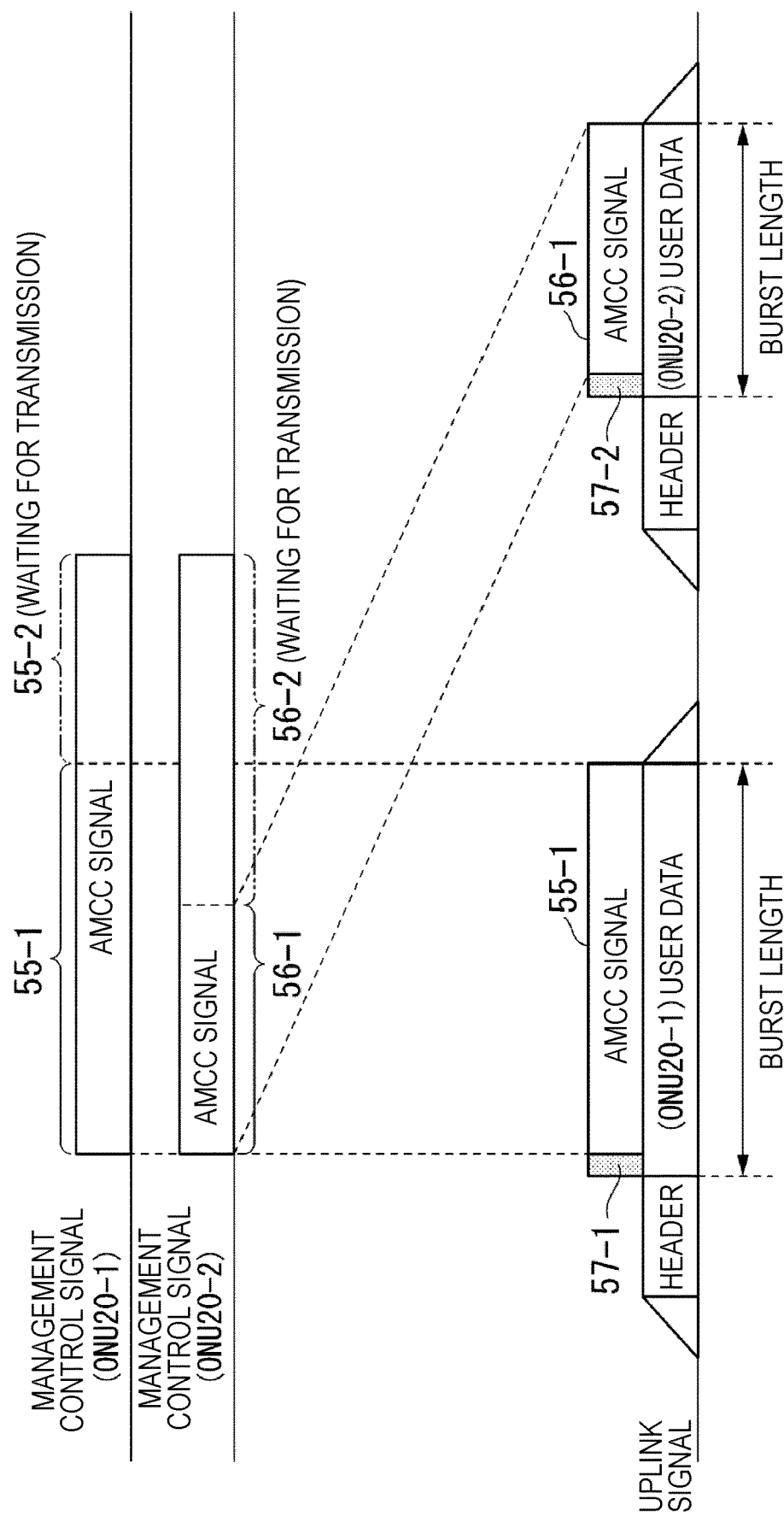
FIG. 7 is a diagram for explaining processing for transmitting an AMCC signal according to the second embodiment.

FIG. 7 is a diagram for explaining processing for transmitting the AMCC signal according to the second embodiment.

FIG. 7 illustrates a situation in which the AMCC signal for each ONU 20 is divided in the relay device 60a and the divided AMCC signal is superimposed on the user data of the uplink signal. As illustrated in FIG. 7, it is assumed that the relay device 60a first receives an uplink signal transmitted from the ONU 20-1. In this case, the AMCC signal generation unit 65-1 corresponding to the ONU 20-1 generates the AMCC signal for the ONU 20-1 based on the information obtained from the management control unit 70. The AMCC signal extraction unit 71 divides the AMCC signal for the ONU 20-1 based on burst length information obtained based on the uplink signal. As a result, the AMCC signal for the ONU 20-1 is divided into divided AMCC signals 55-1 and 55-2. In the example of FIG. 7, identification information 57-1 is added to the divided AMCC signal 55-1. The identification information given here desirably includes information for specifying the ONU 20-1 and identification information indicating that the AMCC signal is divided.

The relay device 60a superimposes the divided AMCC signal 55-1 on the user data of the uplink signal transmitted from the ONU 20-1. The relay device 60a transfers the uplink signal on which the divided AMCC signal 55-1 is superimposed to the OLT 10. Note that the divided AMCC signal 55-2 divided from the AMCC signal for the ONU 20-1 waits for transmission until the uplink signal transmitted from the ONU 20-1 is obtained. The divided AMCC signal waiting for transmission may be stored in a memory (not illustrated).

Next, it is assumed that the relay device 60a receives an uplink signal transmitted from the ONU 20-2. In this case, the AMCC signal generation unit 65-2 corresponding to the ONU 20-2 generates the AMCC signal for the ONU 20-2 based on the information obtained from the management control unit 70. The AMCC signal extraction unit 71 divides the AMCC signal for the ONU 20-2 based on burst length information obtained based on the uplink signal. As a result, the AMCC signal for the ONU 20-2 is divided into divided AMCC signals 56-1 and 56-2.

The relay device 60*a* superimposes the divided AMCC signal 56-1 on the user data of the uplink signal transmitted from the ONU 20-2. The relay device 60*a* transfers the uplink signal on which the divided AMCC signal 56-1 is superimposed to the OLT 10. Note that the divided AMCC signal 56-2 divided from the AMCC signal for the ONU 20-2 waits for transmission until the uplink signal transmitted from the ONU 20-2 is obtained.

As described above, the relay device 60*a* according to the second embodiment generates a different AMCC signal for each ONU 20. As a result, different AMCC signals can be superimposed for each ONU 20.

Figure 8:
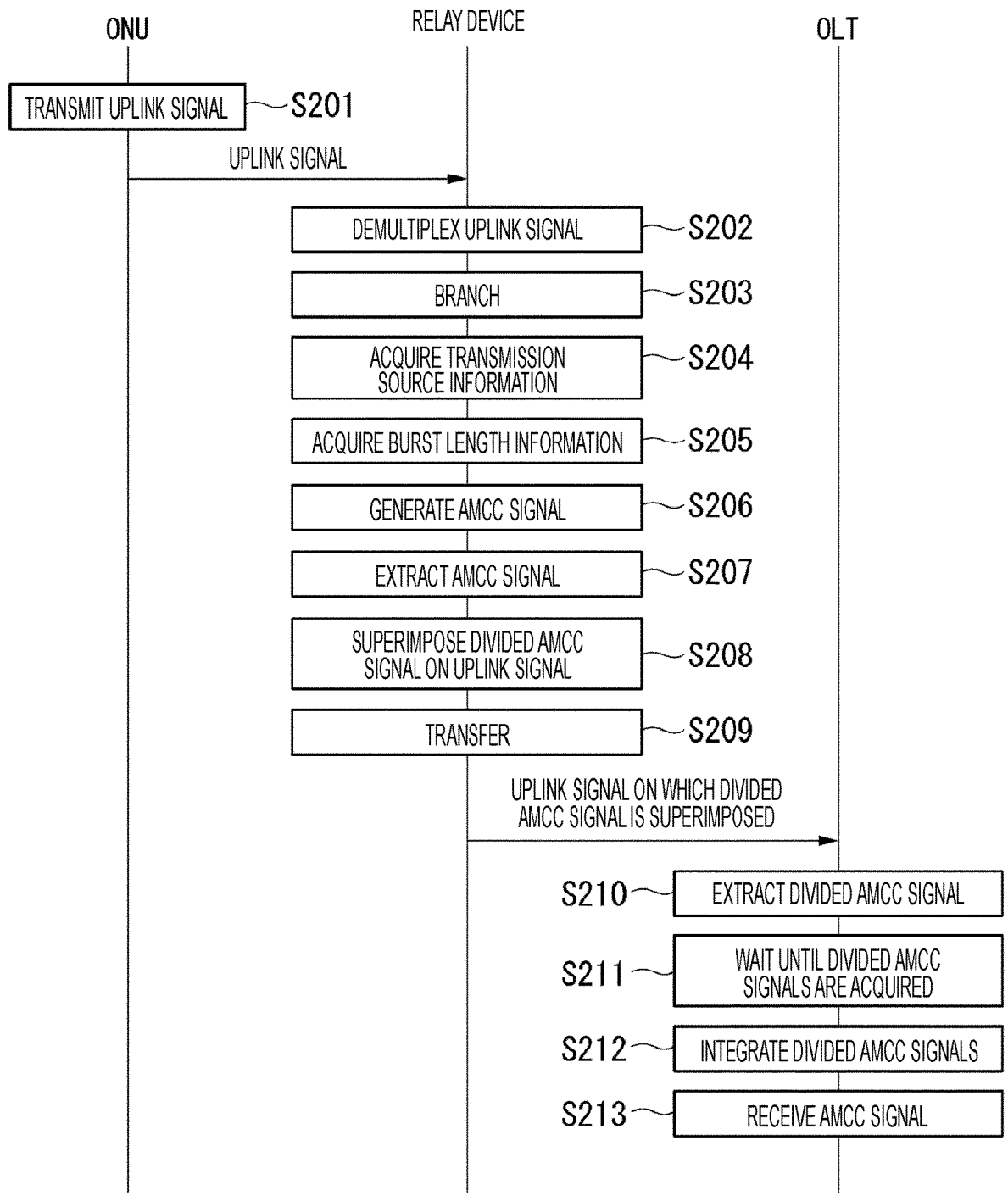
FIG. 8 is a sequence diagram illustrating a flow of processing performed by an optical access system according to the second embodiment.

FIG. 8 is a sequence diagram illustrating the processing flow of the optical access system 1 according to the second embodiment. In the processing of FIG. 8, it is assumed that the ONU 20-1 among a plurality of ONUs 20 transmits an uplink signal.

At the transmission timing allocated to the OLT 10, the ONU 20-1 generates an uplink signal (optical signal) and transmits the signal to the optical transmission line (step S201). The optical signal transmitted from the ONU 20-1 is input to the relay device 60*a*.

The optical multiplexing/demultiplexing unit 61 of the relay device 60*a* outputs the uplink signal input via the optical fiber to the branching device 62 (step S202). The uplink signal input to the branching device 62 is branched into a first path and a second path and output to the paths (step S203). The uplink signal output to the first path is input to the optical reception unit 63. The uplink signal output to the second path is delayed by the delay unit 67.

The optical reception unit 63 converts the uplink signal into an electrical signal and outputs the electrical signal to the user information acquisition unit 72. The user information acquisition unit 72 acquires transmission source information based on the electrical signal received by the optical reception unit 63 (step S204). For example, the user information acquisition unit 72 acquires, from the electrical signal, information for specifying the ONU 20-1 as the transmission source information. The user information acquisition unit 72 outputs the acquired transmission source information to the AMCC signal extraction unit 71. The user information acquisition unit 72 outputs the electrical signal received by the optical reception unit 63 to the burst length acquisition unit 64.

The burst length acquisition unit 64 acquires burst length information based on the electrical signal output from the user information acquisition unit 72 (step S205). The burst length acquisition unit 64 outputs the acquired burst length information to the AMCC signal extraction unit 71.

The AMCC signal generation units 65-1 to 65-*n* confirm whether information is stored in the management control unit 70. Here, it is assumed that information corresponding to the ONU 20-1 is stored in the management control unit 70. The AMCC signal generation unit 65-1 corresponding to the ONU 20-1 generates the AMCC signal using the information stored in the management control unit 70 (step S206). Specifically, the AMCC signal generation unit 65-1 generates an AMCC signal including information for the ONU 20-1 stored in the management control unit 70.

The AMCC signal extraction unit 71 specifies the AMCC signal generation units 65-1 to 65-*n* corresponding to the transmission source ONUs 20 based on the transmission source information acquired from the user information acquisition unit 72. Since the transmission source information acquired from the user information acquisition unit 72 includes information for specifying the ONU 20-1, the AMCC signal extraction unit 71 specifies the AMCC signal generation unit 65-1 corresponding to the ONU 20-1.

Next, the AMCC signal extraction unit 71 divides the AMCC signal generated by the specified AMCC signal generation unit 65-1 based on the burst length information acquired from the burst length acquisition unit 64. Specifically, the AMCC signal extraction unit 71 divides the AMCC signal generated by the AMCC signal generation unit 65-1 to obtain a signal having a magnitude not exceeding the burst length. As a result, the AMCC signal extraction unit 71 extracts the divided AMCC signal for the ONU 20-1 (step S207). The AMCC signal extraction unit 71 adds identification information to the extracted divided AMCC signal. The AMCC signal extraction unit 71 outputs the divided AMCC signal to the AMCC signal superimposition unit 68*a*.

Note that the AMCC signal extraction unit 71 may output the divided AMCC signals each time the burst length information is obtained from the burst length acquisition unit 64, instead of collectively outputting the divided AMCC signals. As a result, a plurality of divided AMCC signals are not output at the transfer timing of one piece of uplink data.

The AMCC signal superimposition unit 68*a* superimposes the divided AMCC signal output from the AMCC signal extraction unit 71 on the uplink signal delayed by the delay unit 67 (step S208). The uplink signal on which the divided AMCC signal is superimposed is input to the optical multiplexer/demultiplexer 69. The optical multiplexer/demultiplexer 69 outputs the uplink signal on which the input divided AMCC signal is superimposed to the OLT 10 (step S209).

The optical multiplexing/demultiplexing unit 11 of the ONU 20 outputs the uplink signal input via the optical fiber to the optical reception unit 14. The optical reception unit 14 converts the uplink signal input via the optical multiplexing/demultiplexing unit 11 into an electrical signal. The AMCC signal extraction unit 151 extracts the divided AMCC signal from the electrical signal converted by the optical reception unit 14 (step S210). The AMCC signal extraction unit 151 outputs the extracted divided AMCC signal to the AMCC signal integration unit 152. At present, there is only one divided AMCC signal for the ONU 20-1. In this case, the AMCC signal integration unit 152 cannot restore the AMCC signal.

The processing from step S202 to step S209 is repeatedly executed every time an uplink signal is obtained in the relay device 60*a*. For example, the processing from step S202 to step S209 is repeatedly executed until the relay device 60*a* finishes transmitting the divided AMCC signal.

For example, it is assumed that the uplink signal transmitted from the ONU 20-1 again is received by the relay device 60*a*. In this case, in a case where there is a divided AMCC signal for the ONU 20-1 that has not been divided and transmitted at the previous time, the AMCC signal extraction unit 71 divides the divided AMCC signal for the ONU 20-1 that has not been transmitted based on newly obtained burst length information. Note that, in a case where the divided AMCC signal for the ONU 20-1 that has not been transmitted is smaller than the burst length indicated by the newly obtained burst length information, the AMCC signal extraction unit 71 does not need to divide the divided AMCC signal. Then, the AMCC signal extraction unit 71 outputs the obtained divided AMCC signal for the ONU 20-1 to the AMCC signal superimposition unit 68*a*. As a result, the divided AMCC signals for the remaining ONUs 20-1 are transmitted to the OLT 10.

The AMCC signal integration unit 152 waits until all the divided AMCC signals are acquired (step S110). For example, in a case where the division identification information is added to the divided AMCC signal, the AMCC signal integration unit 152 waits to perform the processing until the divided AMCC signal to which the division identification information indicating the end of the division is added is acquired. In a case where the division identification information is not added to the divided AMCC signal, the AMCC signal integration unit 152 waits to perform the processing until the divided AMCC signals for a predetermined period are acquired. The predetermined period may be set in advance.

In the second embodiment, since different AMCC signals are generated for each ONU 20, the AMCC signal integration unit 152 classifies divided AMCC signals for each ONU 20 and waits until all the divided AMCC signals are acquired. For example, the AMCC signal integration unit 152 may perform processing of integrating divided AMCC signals at the time when the divided AMCC signals for one ONU 20 are acquired.

When all the divided AMCC signals corresponding to a certain ONU 20 (for example, the ONU 20-1) are acquired, the AMCC signal integration unit 152 integrates the plurality of acquired divided AMCC signals (step S111). As a result, the AMCC signal for the ONU 20-1 is restored. The AMCC signal integration unit 152 outputs the restored AMCC signal to the AMCC signal reception unit 153. The AMCC signal reception unit 153 receives the restored AMCC signal (step S112). Thereafter, the AMCC signal reception unit 153 performs management and control of the ONU 20-1 based on the received AMCC signal.

With the optical access system 1 according to the second embodiment configured as described above, the same effects as those of the first embodiment can be achieved.

Furthermore, in the optical access system 1 according to the second embodiment, since the AMCC signal is generated for each ONU 20, different AMCC signals for each ONU 20 can be superimposed on the main signal.

Modification examples of the first embodiment and the second embodiment will be described.

Topology of the OLT 10 and the ONU 20 in the first embodiment and the second embodiment is not limited to a passive double star type, and may be a bus type or a ring type.

In the first embodiment and the second embodiment, the description has been given assuming that communication is performed between the OLT 10 and the ONU 20 by the TDM-PON system; however, a configuration may be adopted in which various division multiplexing technologies such as wavelength division multiplexing, code division multiplexing, and frequency division multiplexing may be combined with the TDM, not limited to the TDM-PON.

Figure 9:
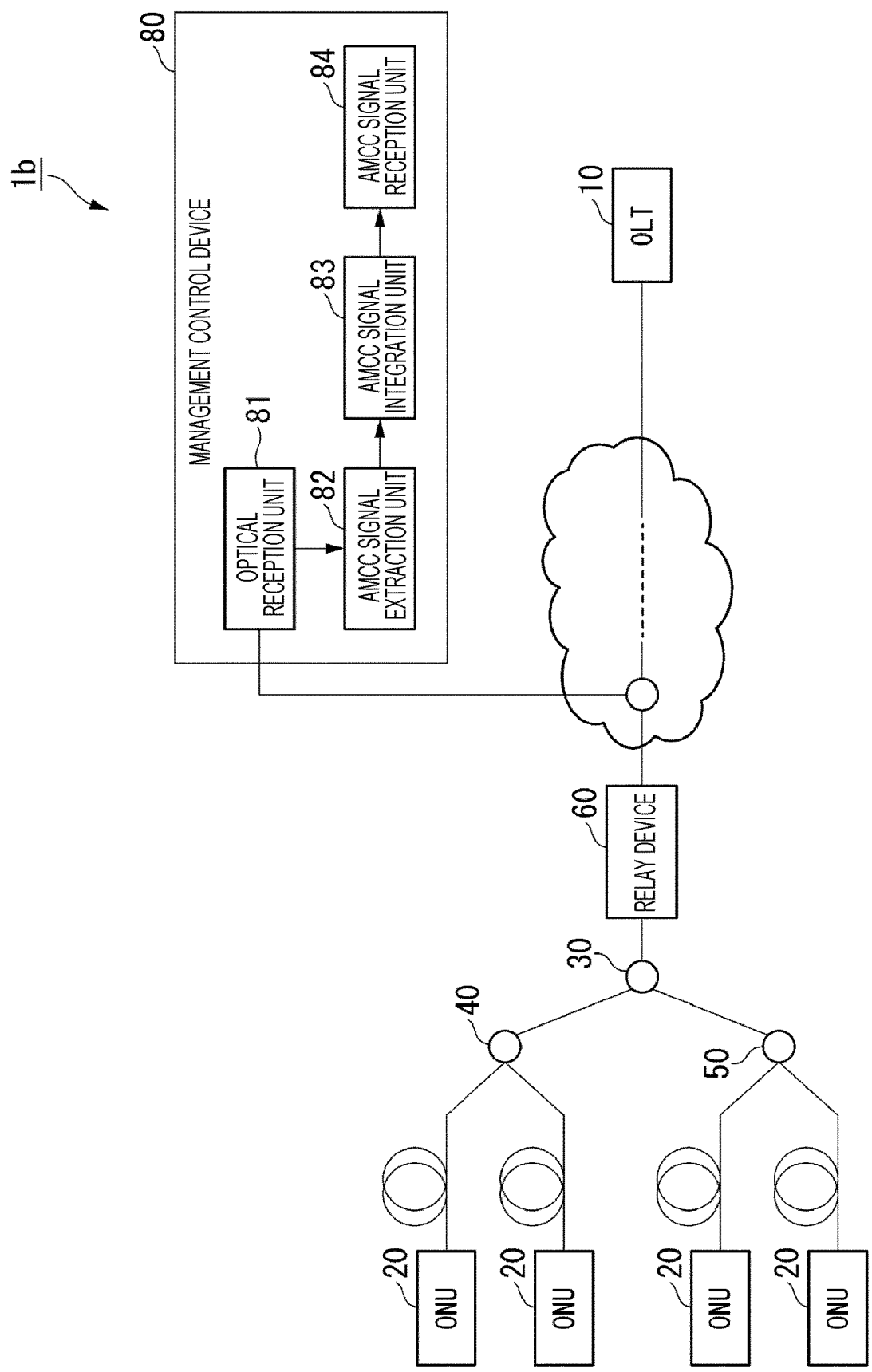
FIG. 9 is a diagram illustrating a configuration example of an optical access system according to a modification example.

In the first embodiment and the second embodiment, the configuration has been described in which the AMCC signal is extracted in the OLT 10; however, as illustrated in FIG. 9, a configuration may be adopted in which the divided AMCC signals may be extracted between the OLT 10 and the relay device 60. In the case of such a configuration, a mechanism (for example, an optical splitter or a switch) for branching an uplink signal may be provided between the OLT 10 and the relay device 60.

FIG. 9 is a diagram illustrating a configuration example of an optical access system 1b according to a modification example.

The optical access system 1b includes the OLT 10, one or more ONUs 20, the relay device 60, and a management control device 80. The present embodiment is different from the first embodiment and the second embodiment in that an uplink signal is branched between the relay device 60 and the OLT 10 is input to the management control device 80 and an AMCC signal is extracted, and the OLT 10 does not include the management control unit 15.

The management control device 80 is provided between the OLT 10 and the relay device 60, and extracts the divided AMCC signal superimposed on the uplink signal. The management control device 80 includes an optical reception unit 81, an AMCC signal extraction unit (signal extractor) 82, an AMCC signal integration unit (integrator) 83, and an AMCC signal reception unit (receiver) 84.

The optical reception unit 81 includes the O/E converter such as a photodetector therein. The optical reception unit 81 receives the uplink signal transferred from the relay device 60, converts the received uplink signal into an electrical signal by an O/E converter, and outputs the electrical signal to the AMCC signal extraction unit 82. The optical reception unit 81 may receive an uplink signal branched from an optical splitter provided between the OLT 10 and the relay device 60, for example.

The AMCC signal extraction unit 82 performs processing similar to that of the AMCC signal extraction unit 151.

The AMCC signal integration unit 83 performs processing similar to that of the AMCC signal integration unit 152.

The AMCC signal reception unit 84 performs processing similar to that of the AMCC signal reception unit 153.

The optical access system 1b may include a relay device 60a instead of the relay device 60. In the case of such a configuration, each functional unit included in the management control device 80 performs processing similar to that of the functional unit having the same name included in the OLT 10 in the second embodiment.

A part of the functions of the OLT 10, the ONU 20, the relay devices 60 and 60a, and the management control device 80 in the above-described embodiments may be realized by a computer. In that case, a program for implementing these functions may be recorded in a computer-readable recording medium, and the program recorded in the recording medium may be read and executed by a computer system to implement the functions. The "computer system" mentioned herein includes an OS and hardware such as a peripheral device.

The "computer-readable recording medium" refers to a portable medium such as a flexible disk, a magneto-optical disc, a ROM, or a CD-ROM, or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. Also, the above program may be for implementing some of the functions described above, may be formed with a combination of the functions described above and a program already recorded in the computer system, or may be formed with a programmable logic device such as an FPGA.

While the embodiments of the present invention have been described in detail with reference to the drawings, specific configurations are not limited to these embodiments, and include designs and the like without departing from the spirit of the present invention.

INDUSTRIAL APPLICABILITY

The present invention can be applied to an optical access system that performs at least time division multiplexing.

REFERENCE SIGNS LIST

10 OLT (optical communication device)
11 Optical multiplexing/demultiplexing unit
12 Optical transmission unit
13 Media access control unit
14 Optical reception unit
15 Management control unit
20 ONU (optical communication device)
60, 60a Relay device
61, 69 Optical multiplexing/demultiplexing unit
62 Branching device
63, 81 Optical reception unit
64 Burst length acquisition unit
65, 65-1 to 65-n AMCC signal generation unit
66 AMCC signal division unit
67 Delay unit
68, 68a AMCC signal superimposition unit
69 Optical multiplexer/demultiplexer
70 Management control unit
71 AMCC signal extraction unit
72 User information acquisition unit
80 Management control device (optical communication device)
82, 151 AMCC signal extraction unit
83, 152 AMCC signal integration unit
84, 153 AMCC signal reception unit

The invention claimed is:

1. A relay device that performs relay among a plurality of optical communication devices that perform communication using at least time division multiplexing, the device comprising:
a data length acquirer configured to acquire information on a data length of an uplink signal transmitted from an optical communication device using the uplink signal;
a management control signal generator configured to generate a management control signal used for management and control;
a management control signal divider configured to divide the generated management control signal based on the information on the data length of the uplink signal acquired by the data length acquirer; and
a management control signal superimpositor configured to superimpose the divided management control signal on the uplink signal and transfers the superimposed signal to another optical communication device.

2. The relay device according to claim 1, wherein the management control signal divider divides the management control signal into a size not exceeding a data length indicated by the information on the data length of the uplink signal.

3. The relay device according to claim 1, further comprising
a brancher configured to branch the uplink signal transmitted from the optical communication device, wherein
the management control signal superimpositor superimposes the divided management control signal on the uplink signal to which a delay is given on one branched path.

4. The relay device according to claim 1, further comprising
a user information acquirer configured to acquire transmission source information indicating a transmission source of the uplink signal from the uplink signal, wherein the management control signal generator is provided for each optical communication device, and
the management control signal divider divides the management control signal generated by the management control signal generator related to a transmission source optical communication device indicated by the transmission source information acquired by the user information acquirer based on the information on the data length of the uplink signal.

5. An optical access system comprising: a first optical communication device that performs communication using at least time division multiplexing; a second optical communication device; and a relay device that performs relay between the first optical communication device and the second optical communication device, wherein
the relay device includes
a data length acquirer configured to acquire information on a data length of an uplink signal using the uplink signal transmitted from the first optical communication device,
a management control signal generator configured to generate a management control signal used for management and control,
a management control signal divider configured to divide the generated management control signal based on the information on the data length of the uplink signal acquired by the data length acquirer,
a management control signal superimpositor configured to superimpose the divided management control signal on the uplink signal and transfers the superimposed signal to another optical communication device,
a signal extractor configured to extract the divided management control signal superimposed on the uplink signal transferred from the relay device, and
an integrator configured to integrate the divided management control signals to restore the management control signal.

6. The optical access system according to claim 5, further comprising
a management control device configured to manage and control the first optical communication device, wherein
the management control device includes a receiver configured to receive the uplink signal transferred from the relay device,
the signal extractor, and
the integrator.

7. A relay method performed by a relay device that performs relay among a plurality of optical communication devices that perform communication using at least time division multiplexing, the method comprising:
acquiring information on a data length of an uplink signal transmitted from the optical communication device using the uplink signal;
generating a management control signal used for management and control;
dividing the generated management control signal based on the acquired information on the data length of the uplink signal; and
superimposing the divided management control signal on the uplink signal and transferring the superimposed signal to another optical communication device.

* * * * *